Aug. 8, 1967  R. B. SPOKAS ETAL  3,334,717
SELF-CONTAINED WET CLUTCH SYSTEM
Filed Nov. 1, 1965  6 Sheets—Sheet 3

Inventors
Romas B. Spokas
and James Lake
By Joseph W. Malleck
Atty

Aug. 8, 1967  R. B. SPOKAS ET AL  3,334,717
SELF-CONTAINED WET CLUTCH SYSTEM
Filed Nov. 1, 1965  6 Sheets-Sheet 4

Inventors
Romas B. Spokas
and James Lake
By Joseph W. Malleck
Att'y.

United States Patent Office 3,334,717
Patented Aug. 8, 1967

3,334,717
SELF-CONTAINED WET CLUTCH SYSTEM
Romas B. Spokas, Rockford, Ill., and James Lake, Oakland, Calif., assignors to Borg-Warner Corporation, Chicago, Ill., a corporation of Illinois
Filed Nov. 1, 1965, Ser. No. 505,792
10 Claims. (Cl. 192—113)

This invention relates to friction devices and more particularly to a self-contained wet clutch system where the friction elements are continuously bathed by a supply of fluid.

Wet clutches of the type installed in current vehicles, are quite costly, elaborate, and difficult to engineer. One difficulty arises in furnishing the supporting equipment to serve the wet clutch. Since all wet clutches require circulated oil or other fluids, a pump is required in the system. A power take-off mechanism of some type is, therefore, required to drive the hydraulic pump. Design limitations usually dictate that the pump and pump drive be located some distance from the clutch which then creates a plumbing problem in getting the oil or other fluids to and from the clutch.

Another problem in the design of a satisfactory wet clutch system is that of maintaining sufficiently low release efforts on the part of the operator since the coefficient of friction between friction elements of a wet clutch is much lower than in a dry clutch. This requires that the clutch be either larger in diameter, have more friction elements or plates, or have a higher applied clamping load to deliver an equivalent torque. Some systems utilized some type of power assist device attached to the external linkage; with the assist device mounted externally of the clutch sealing becomes critical and leakage is a problem.

Still another consideration in the design of wet clutch system is that of a transmission brake. A transmission brake usually becomes necessary in a wet clutch system as viscous drag is present resulting from oil flowing between the clutch plates when the clutch is in the released position. In present spring-loaded wet clutch systems, this transmission brake is usually located externally of the clutch device and is operated by the clutch release linkage. This requires that the clutch release and the brake engagement be maintained in fine adjustment at all times to prevent a fight between the clutch and transmission brake.

The present invention has been conceived to overcome the above limitations and problems of typical prior art wet clutch systems by the provision of a self-contained system which can be easily attached to the engine flywheel of a vehicle; the components comprising a clutch, an oil circulating pump, transmission brake, and in some cases a hydraulic assist has been arranged in a single compact package.

Therefore, the primary object of this invention is to provide an improved wet clutch or other friction device which is characterized by greater economy, more rugged construction, and which is less subject to leakage problems.

Another object is to provide a self-contained wet clutch system having an integrated fluid operating system all arranged within a unit which is not much larger than the prior art clutch component itself. Particular features pursuant to this object is the provision of a sleeve-shaped fluid unit mounted for reciprocal movement with a rotative drive sleeve which is journalled on the output shaft of the clutch, the latter being drivingly connected with the input means of the clutch. The fluid unit houses pumping elements, and in some cases a fluid assist or servo-mechanism, and fluid directing means effective to normally convey fluid to friction elements for maintaining a continuous bath during all conditions of operation.

Yet another object of this invention is to provide a wet type friction device which is self-contained but which is relatively free from dynamic fluid unbalance. A specific teaching pursuant to this is the provision of input and output clutch means which define a compact fluid enclosure for containing the fluid effective to bathe the friction elements, and the provision of balanced fluid chambers within a reciprocal fluid unit which may be used for powered assist in disengaging the clutch.

Yet still another object of this invention is the provision of an integrated wet clutch system which has been improved to substantially eliminate foaming action of the fluid bath tending to decrease effectiveness of friction plate cooling.

Other objects and advantages of this invention will become more apparent from the following detailed description taken in connection with the accompanying drawings in which.

Figure 1:
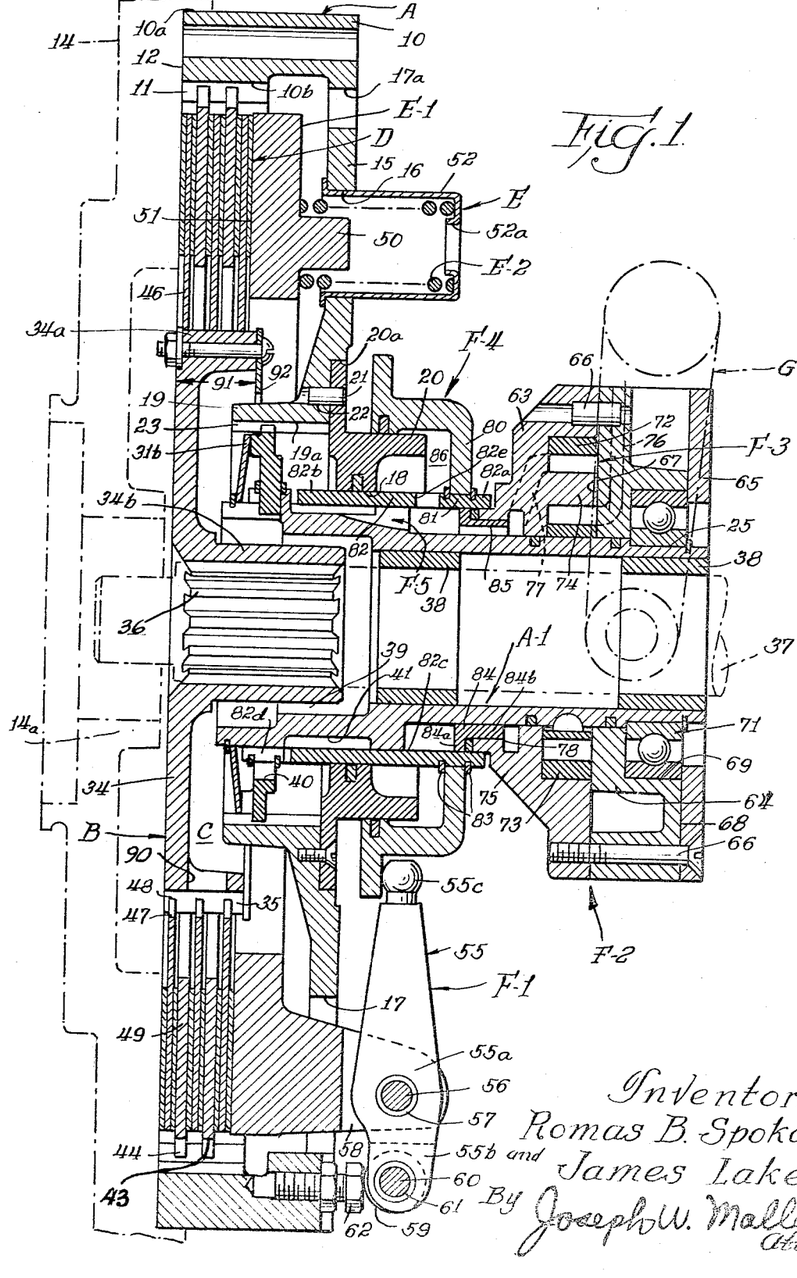
FIGURE 1 is a central elevational cross-section of a self-contained wet clutch adapted to be attached to a flywheel of a vehicle engine and which embodies the principles of this invention.
Figure 2:
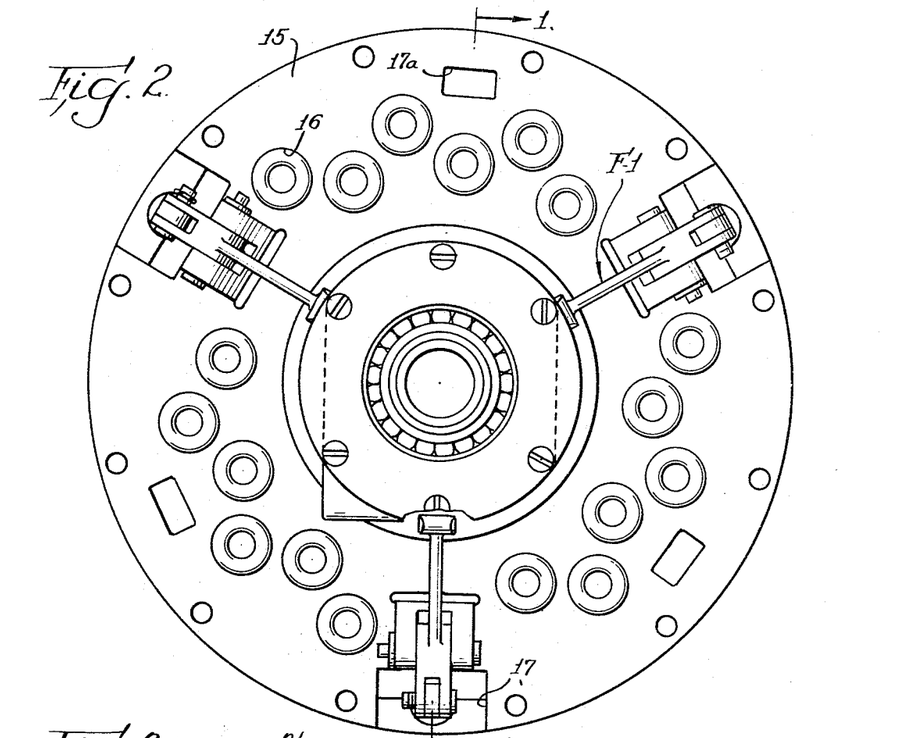
FIGURE 2 is a reduced side elevational view of the structure illustrated in FIGURE 1, having certain portions thereof broken away.
Figure 3:
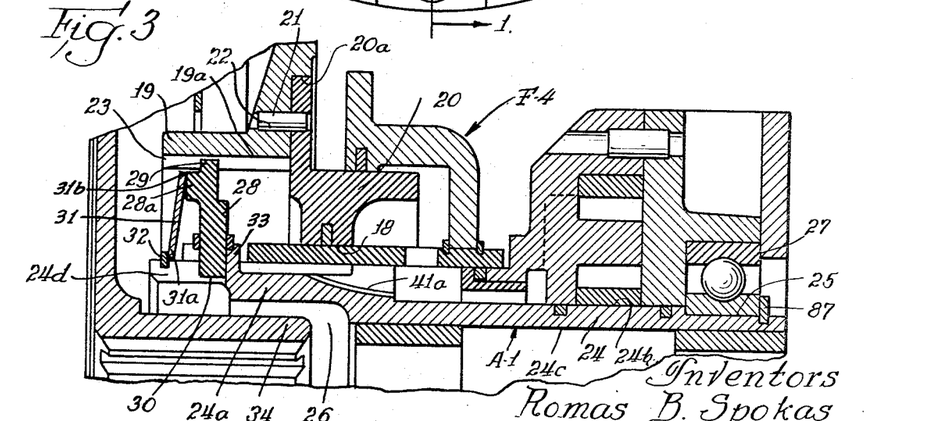
FIGURE 3 is an enlarged fragmentary cross-section of a portion of the structure of FIGURE 1.

Turning now to the drawings and particularly to FIGURES 1-3, there is illustrated a preferred embodiment of this invention which broadly comprises a rotative input means A employing a drive sleeve A-1 extending rearwardly therefrom and which is effective to reciprocate relative to the input means while being rotatively driven thereby; a rotative output means B cooperating with the input means to define a fluid enclosure C within which is disposed a plurality of friction elements D associated with each of the input and output means to form a pack. Means E is employed to provide a normal resilient engaging force and includes a rotatively driven pressure plate E-1 and a plurality of coil springs E-2 acting between the input means A and the pressure plate to provide clutch engagement. The self-contained system has an operating assembly F employing a plurality of radially disposed levers F-1 which are connected to the pressure plate and adapted to provide a pulling action to disengage the clutch; a reciprocal fluid unit F-2 is mounted for movement with the drive sleeve A-1 and is adapted to engage the levers F-1 for providing the pulling action for disengagement. The reciprocal fluid unit F-2 consists of several sub-assemblies including fluid pumping means F-3, a hydraulic servo means F-4, and fluid directing means F-5 for continuously conveying the fluid output of the pumping means to the chamber C for cooling the friction elements and for selectively conveying fluid to the servo means F-4. A manually operated means G is employed to initiate the disengaging operation of the assembly F.

Turning now to the components in particular, the rotary input means A comprises an annular drive ring 10 having a cylindrical body with an outer cylindrical surface 10a which defines the maximum diameter of the clutch device; the ring 10 has an interior cylindrical surace 10b on which is defined a plurality of axially extending splines 11. The ring has a front flat face 12 adapted to be mated with a flywheel 14 which is typically an element of the engine unit of a vehicle, although cooperating with the clutch device. The ring is attached to the flywheel by fasteners (not shown) extending through axially directed openings which are circumferentially spaced thereabout. A substantially flat backing plate 15 is sepdarately attached to the ring 10 or may be integrally formed therewith to extend radially inwardly thereof. Plate 15 has a first ring of circumferentially spaced openings 16 adapted to receive the engaging springs E-2 as will be described and a second series of circumferentially spaced openings 17 for permitting bosses of the pressure plate E-1 to extend therethrough. A central opening 18 is defined in the backing plate through which extends the output means B. Adjacent the central opening 18 is formed means having forward and rearwardly extending flanges 19 and 20, flange 20 may be formed as a separate element which is attached to the backing plate within a recess 20a and is drivingly keyed thereto by pins received in openings 22 extending through both of the flanges. The forward flinge 19 is generally cylindrically shaped and has an interior surface 19a provided with a plurality of axially extending splines 23. Flange 20 is disposed slightly radially inwardly of flange 19 in the preferred embodiment. Sleeve A-1, which forms a part of the input means, has an elongated cylindrical body 24 provided with outer stepped portions 24a and 24b; portion 42a extends through the central opening 18 of the backing plate in spaced relationship so as to pilot a portion of the operating assembly therebetween. Portion 24b has an annular recess 25 defined therein to receive a bearing 27 for journalling the aft portion of the reciprocal fluid unit F-2 as will be described. Another recess 26 is defined in the interior surface 24c of the body 24 for receiving a journal member 34 receiving a portion of the driven means B. An annular drive element 28 interconnects the flange 19 of the backing plate and the portion 24a of the sleeve A-1. Annular member 28 has an outer periphery provided with axially extending splines 29 (see also FIGURE 5) effective to be received within the complementary splines 23 of flange 19 thereby providing a driving rotative connection therebetween; the inner periphery of member 28 has equi-cumferentially spaced tangs 30 (three in number) extending radially inward into end slots 24d formed in the stepped portion 24a of the drive sleeve for rotation therewith. The annular member 28 is biased to one axial position on the drive sleeve A-1 by Belleville spring or diaphragm 31 having an inner periphery 31a locked or fixed in one axial direction with the drive sleeve A-1 by a snap ring 32; an outer periphery 31b of the diaphragm in engagement with a plurality of bosses 28a formed along the outer margin of the annular member 28 effective to urge it in a rightward direction (as viewed in FIGURE 1) so that the member may engage a shoulder 33 defined on portion 24a of the drive sleeve. This biased connection urges the member 28 to move axially along with the drive sleeve.

The rotary output means B comprises a hub 34 having a plurality of splines 35 and a radially inner portion 34b having internal splines 36 for providing a rotative driving connection with a driven shaft 37 received therein and extending through the drive sleeve A-1; axially spaced bushings 38 provided a pilot or journal for drive sleeve A-1 on the shaft 37.

The fluid chamber C is defined by mating flywheel 14 with the drive ring 10, the inner portion of the chamber being closed by nesting of the hub 14a of the flywheel with the driven hub 34, which in turn journals the drive sleeve forming part of the backing plate. Fluid communication into chamber C is gained through slots 40 formed in the member 28 and are, by way of slots 24d, normally in communication with an annular recess 41 defined in the outer surface of portion 24a; the degree of communication is regulated by the fluid unit F as will be described. The friction elements D may be comprised of a plurality of friction discs 46 each having a central opening 47 provided with splines 48 effective to mate with the complementary splines 35 on the hub flange 34a, and a plurality of inter-leaved friction plates 48 rotatively held by the drive ring 10 by way of splines 44 formed on the outer periphery 43 of plates 49 and received in complementary splines 11 of the drive ring.

The clutch engaging means E particularly comprises the annular pressure plate E-1 provided with a plurality of rearwardly extending bosses 50; the pressure plate has a front face 51 adapted to frictionally engage the pack of friction elements D. The pressure plate is normally urged to promote clutch engagement by the plurality of coil springs E-2, each spring having one end journalled about a boss 50 of the pressure plate and an opposite end journalled with a flared portion 52a of the spring cups 52, the latter being received in the openings 16 of the backing plate.

The operating assembly F of the preferred embodiment has a lever system F-1 of the pull-type wherein each lever 55 has an intermediate portion 55a journalled or pivoted about an axis 56 provided by a needle bearing assembly 57 carried by arms 58 protruding through the openings 17 in the backing plate; the arms are integrally formed on the pressure plate E-1. The outer portion 55b of each lever has an antifriction contact provided by a rollable member 59 journalled on an axis 60 of the outer end by a needle bearing assembly 61, said roller assembly being effective to contact suitable stops 62 extending rearwardly from the outer periphery of the backing plate of the drive means. The inner end 55c of each lever is accordingly adapted to be moved in a rightward direction (as viewed in FIGURE 1) so as to pull the intermediate portion 55a and thereby the pressure plate with it for disengagement of the clutch. Movement of the end 55c must be accomplished by a force sufficient enough to overcome the engaging means E which also act on the pressure plate body in an opposite axial direction.

Figure 1A:
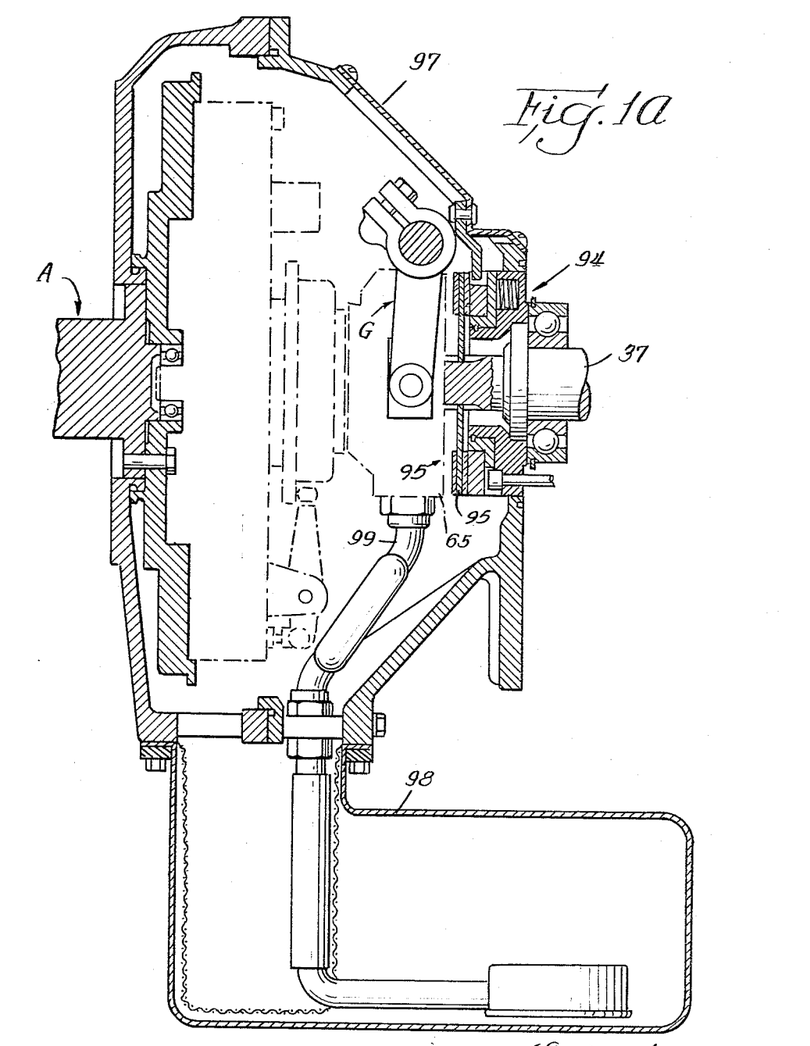
FIGURE 1a is a sectional illustration of an overall assembly for the device herein.

The reciprocal fluid unit F-2 is provided for pulling the inner portion 55c of the levers in a retracting direction as part of its function. The unit F-2 has an aft sub-assembly or element F-3 comprising a pump housing (including portions 63 and 64), and plates 65 are joined together at the outer periphery by suitable fasteners 66. Housing portion 64 has a generally flat interior face 67, disposed in a radial plane with respect to the axis of rotation of the device, and has an exterior side 68 provided with an annular recess 69 facing rearwardly for journalling the bearing 71 which is piloted upon the recess 25 of the rear portion of the drive sleeve A-1. The other housing portion 63 has an interior cavity 72 for receiving a pair of pumping gears 73 and a suitable crescent element which together constitutes the interior pumping elements. The forward outer surface 74 of housing portion 63 has an annular neck 75 spaced from the drive-sleeve. A passage 76 communicates the exterior of housing portion 64 with the inlet side of said pumping elements and may be coupled by a flexible connection 99 (see FIGURE 1a) to receive fluid from a sump 98 formed at the bottom portion of a clutch housing 97 which would normally be employed to surround the entire wet clutch system. Housing portion 63 has a passage 77 communicating the fluid exit of the pump elements with an annular groove 78 defined in the neck 75 thereof.

Plate 65 forms a pressure element for an anti-drag brake 96 (see FIGURE 1a) which operates to engage a brake disc 95 splined to shaft 37, in synchronization with the disengagement of elements D. Brake 96 may comprise a reaction assembly 94 mounted within the rear portion of clutch housing 97.

Figure 4:
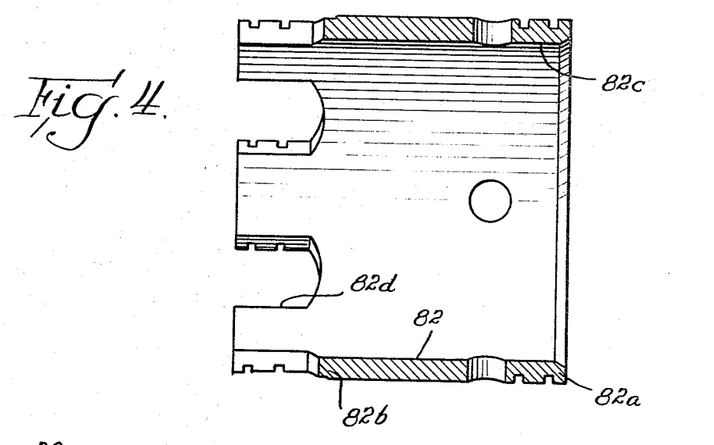
FIGURE 4 is a central sectional view of a tube forming part of the fluid directing means.

A second sub-assembly or element F-4 is provided as part of the fluid unit F-2 and comprises a cup-shaped member 80 having a central opening 81 to receive a tubular or sleeve-like member 82 snugly therein. The tubular member 82 has an extremity 82a fitting in slidable sealing relationship with the exterior of the neck 75 of element F-2. The member 80 is positioned on the tube for reciprocal movement therewith by snap rings 83 disposed in grooves on the tube and on opposite sides of the cup-shaped member. The forward portion 82b of the tube has an outer surface in sliding sealing engagement with the interior wall of the central opening 18 of the backing plate; end 82b has a plurality of slots 82d formed therein (see FIGURE 4) which permit the tangs 30 of member 28 to extend therethrough. The interior of member 80 is in sliding sealing engagement with flange 20 and thereby completes definition of a pressure chamber 86 effective to hydraulically move sub-assembly F-4 to the right by reaction against flange 20. An internal ring 84 is employed having a flange 84a in sliding sealing engagement with the interior cylindrical surface 82c of tube 82 and has a neck 84b nested within the neck 75 of elements 65; one or more slots 85 communicate the groove 78 of housing portion 63 with the interior of tube 82. The inner surface of tube 82 is piloted on the outer surface of forward portion 24a of the drive sleeve A-1.

Both sub-assemblies F-3 and F-4 are normally urged together as a unit by the annular member 28 which is spring biased by the Belleville diaphragm 31 in a rightward direction (viewed in FIGURE 1); sub-assembly F-3 is prevented from movement axially to the right on the drive sleeve by a snap ring 87. Thus, sub-assembly F-3 and F-4 will move axially together the right with the drive sleeve as urged by manual means G. The outer housing (63 and 64) of sub-assembly F-4 will not rotate with the drive sleeve but is fixed against rotation by connection to the manual means G. Furthermore, sub-assembly F-4 is relatively axially moveable with reference to sub-assembly F-3; this relative reciprocal movement is necessary for operation of the servo means as will be described.

Turning now to the operation of the preferred embodiment, the clutch is shown in the engaged condition in FIGURE 1. In such condition the sub-assembly F-4 is biased to the right by spring pressure communicated from E through the lever system F-1. There is no residual fluid pressure in chamber 86.

By way of the recess 41, slots 82d in tube end 82b, and openings 40 in member 28, the fluid output of the pumping means F-3 may be fully communicated to enclosure C. Such fluid enters the radially inner portion of the enclosure and is thrown by centrifugal force against flange 34a of the driven hub 34 (as guided by ring 92 on hub 34) where it may pass through openings 90 therein to the friction elements D. Fluid will seek to traverse the friction elements in a radially outward direction and will be totally free to do so when the elements are disengaged and in a restricted manner when the elements are engaged through suitable grooving in the friction material of the elements. Fluid may then pass between the splines 11 and 44 to move axially rearwardly and out of the enclosure through openings 17 or 17a. Anti-foaming action of the cooling fluid is provided by the compact entrainment of the enclosure and the axial relief of fluid therefrom; the transverse dimension 91 of the enclosure is substantially equal to the transverse dimension of the stacked friction elements.

The Belleville diaphragm 31 is effective to urge the annular member 28 to the right against the shoulder 33 of the forward portion 24a of the drive sleeve, and thereby urge tube 82 and cup member 80 to the position shown with the end of slots 82d spaced from shoulder 33. In this condition the fluid unit F-2 rotates with the input means and receives drive from the drive sleeve for operating the pumping elements therein, the pumping elements receiving a rotative reaction from the rotationally stationary portions 63 and 64.

To disengage the clutch, the manual operating means G is moved such that the sub-assembly F-2 will be moved to the right along the driven shaft and carrying the drive sleeve A-1 with it. The clutch engaging springs E-2 will offer resistance to movement of the second sub-assembly F-4 until sufficient disengaging force is developed. Thus, the sub-assembly F-4 will remain substantially axially stationary thereby progressively flexing or compressing the Belleville diaphragm and closing off the spacing between the end of the slots 82d in tube 82. The greater enclosure of said spacing, the greater will be the restriction of fluid flow therethrough causing the pressure to proportionally rise in the pressure chamber (pressure chamber 86 being in continuous communication with the space, interposed between grooves 85 and grooves 41a, by radial directed openings 82e) with the degree of movement of the manual means; actuation of the member 80 thus hydraulically moves the sub-assembly F-4 to the right to push the first sub-assembly F-2 therewith for adding an assist. During the complete disengaging movement, at no time is cooling fluid totally shut off from the chamber C since the spacing is never completely dissipated.

Figure 6:
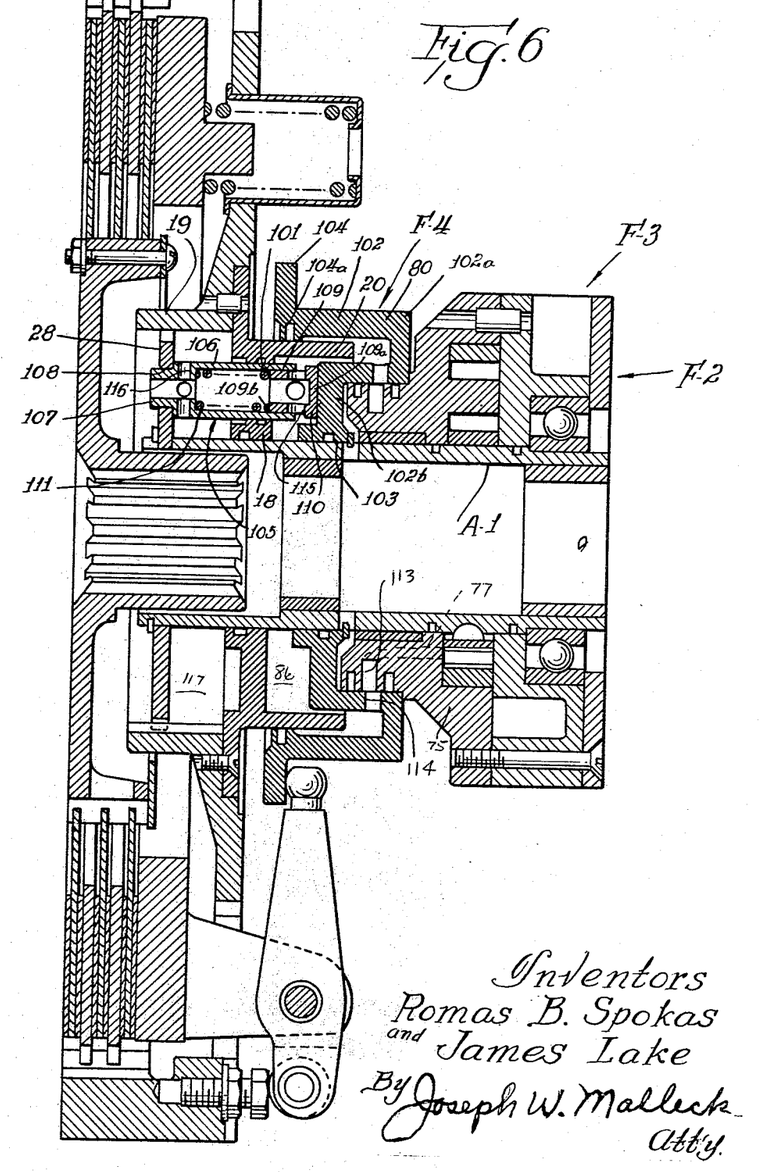
FIGURE 6 is an illustration of an alternative embodiment of this invention.

FIGURE 6 illustrates one alternative construction employing basic components, similar to that of the preferred embodiment, of a fluid unit F-2 having a pumping means F-3, a servo means F-4, the latter means being mounted for reciprocation with a drive sleeve A-1 forming part of a rotative input means A.

A variation is specifically provided in the definition of the servo means F-4. The backing plate 15, although having a central opening 18 through which extends the driven shaft 37, has walls defining the opening 18 in a manner to slidably seal against the exterior of the driven sleeve A-1 (in opposition to sealing against an additional tube as in the preferred embodiment). A plurality of circumferentially spaced openings 101 are provided in the backing plate and are spaced slightly radially outwardly of the opening 18. The servo means F-4 is specifically comprised of a unitary slideable member 102 having an annular channel section 102a provided with a radially inwardly extending wall 102b having a central opening 103 adapted to slideably seal on the exterior of the drive sleeve A-1; the outer portion of the channel section 102a carries a radially outwardly extending flange 104 effective to engage the lever system F-1 for a pull-type retraction movement. The radially inner shoulder 104a is effective to pilot or journal on the exterior of rearwardly extending flange 20 of the backing plate.

The splined driving member 28 rotatively interconnects the forward flange 19 with the drive sleeve A-1 and the plurality of axially directed openings 101 journalling a plurality of spring assemblies 105 effective to cooperate as a fluid diverting means. Each spring assembly 105 comprises a hollow tube 106 having a nose 107 at one end received in one of the openings 108 of the annular member 20; another sleeve-like member 109 is telescopically received within the hollow interior of the tube 106 and has one end 109a abutting the inwardly facing side 110 of wall 102b of the servo means F-4. The tube 106 and member 109 are normally urged apart by a coiled compression spring 111 having one end adapted to engage the nose 107 of the tube and another end adapted to engage the end 109b of member 109.

Instead of fluid communication to enclosure C being through passages defined on the drive sleeve (as permitted by the stepped figuration in preferred embodiment), fluid communication is directed from the pumping means F-3 first to the pressure chamber 86 and thence to the fluid enclosure C (the drive sleeve has a straight cylindrical configuration and is not stepped). Fluid communication is specifically provided by a recess 113 in the outer side of neck 75 of the pump housing 63, which receives the fluid output of the pumping elements through passage 77 similar to that of the preferred embodiment. The unitary member 102, which performs as a piston for the servo means, has one or more openings 114 disposed in the radially inner side of the channel section 102 to communicate the recess 113 with the interior of pressure chamber 86 thereof. The openings 114 are sized to provide a communication even though the member 102 undergoes relative sliding movement with reference to the neck 75 of the pumping assembly F-3. In the condition of FIGURE 6, chamber 86 is in free communication with enclosure C by way of openings 115 defined in the sleeve-like member 109 communicating with the interior of the spring assembly 105. Fluid then passes through the interior of the spring assembly and radially out through openings 116 and thence through the annular member 28 to enclosure C.

The function of the spring assembly 105 is similar to the fluid diverting means of the preferred embodiment, but the structure is quite different. Upon movement of assembly F-3 manual means G, the annular member 28 is urged to move axially therewith by way of the drive sleeve A-1. Member 102 will be urged to move with assembly F-3 by way of the spring assemblies 105 providing a resilient force working in a righthand direction (taken with respect to FIGURE 4). However, the springs 111 will be initially overcome by the reaction force from the engaging springs E-2 to hold the member 102 relatively axially stationary. Thus, the tube 106 will be urged by the annular member 28 to telescope further over the member 109 thereby progressively closing off the free communication between the radial openings 115 and chamber 86. With this condition, pressure then begins to build up within the pressure chamber 86 providing a hydraulic force reacting against the backing plate to urge the member 102 with the assembly F-3 thereby providing a hydraulic assist to promote disengagement.

Again, chambers 86 and 117 provide a balanced dynamic condition under high speeds so that any centrifugal forces developed within the fluid therein may not interfere with the intended operations of the device.

Figure 5:
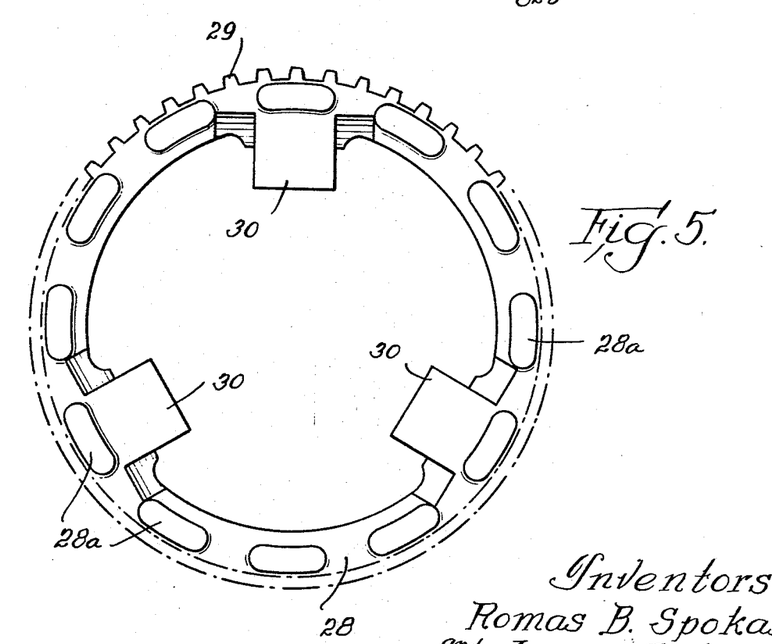
FIGURE 5 is an end view of an annular splined member forming part of the input means.
Figure 7:
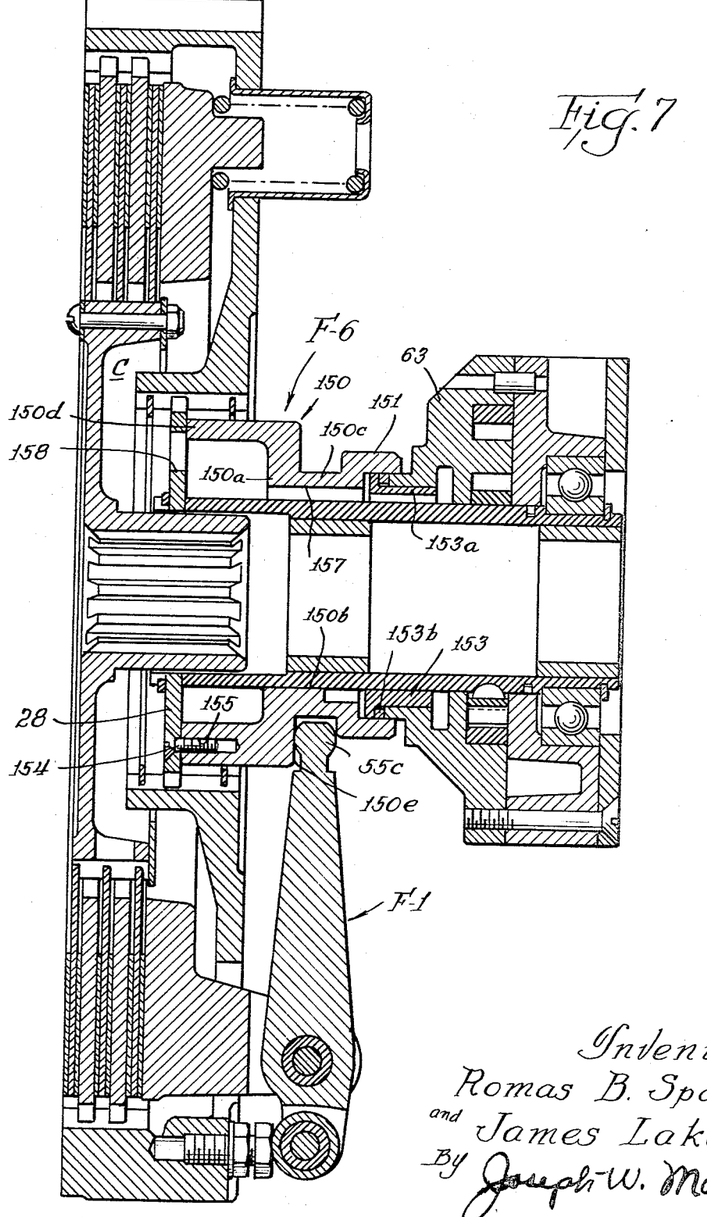
FIGURE 7 is an illustration of still another alternative embodiment of this invention.

In FIGURE 7 is shown still another alternative embodiment, similar reference numerals being again applied where parts are identical to that of the preferred embodiment. In this construction, the fluid unit F-2 is devoid of a servo means; the device depends solely upon the input force from a manual means G to complete disengagement. To this end the assembly F-6 is provided for maintaining a direct mechanical connection between the ends of the levers defining the system F-1 and the annular member 28 which is part of the driving or input means A. Assembly F-6 includes a unitary stepped sleeve 150 having a central body 150a provided with an interior opening 150b journalled on the exterior of the drive sleeve, which in this embodiment, is a straight cylindrical member. The rearward portion 150c has an annular lip 151 adapted to overlie the neck 75 of the pumping means F-3 and provides a seal connection therebetween by use of an annular ring 153b received in a bushing 153. The other end 150d has an annular member 28 and is drivingly coupled therewith by a plurality of circumferentially spaced fasteners 154 received in threaded openings 155 in the flange 150d. The shoulder 150e, provided by stepping of the flange 150d, is effective to engage the inner ends of the levers for movement to the right (as shown in FIGURE 5). Assembly F-6 is effective to contain fluid directing means for *only* directing the fluid outlet of the pumping elements to the fluid enclosure C. To this end, the bushing has one or more axial slots 153a defined in its inner surface thereof in communication with the annular recess defined in a forward pump housing 63. The body 150a of the member 150 also has aligned slots 157 communicating the forward interior of the member 150 with the slots 153a in the bushing. Openings 158 are then provided in the annular member 28 completing the communication to the interior of enclosure C.

Operation of the embodiment of FIGURE 7, is similar to that of the preferred embodiment except to the extent of a hydraulic assist which it lacks.

While we have described our invention in connection with one specific embodiment and other alternative suggestions thereof, it is understood that this is by way of illustration and not by way of limitation and the scope of our invention is defined solely by the appended claims which should be construed as broadly as the prior art will permit.

We claim:

1. A self-contained wet clutch system, comprising: rotatable input means and rotatable output means cooperating to define a fluid enclosure, said output means having a driven shaft extending out of said enclosure; friction elements disposed in said enclosure and effective to be normally inter-engaged for drivingly connecting said input and output means together and effective to be selectively disengaged for interrupting said connection; a drive sleeve mounted about said driven shaft and effective to rotate with said input means while being free to reciprocate relative thereto; an operating assembly operably connected with said friction elements for providing disengagement of said connection and being mounted about said drive sleeve for reciprocal movement therewith while fixed against rotation therewith; a fluid pumping means, said operating assembly carrying said fluid pumping means in a manner to receive rotative drive from said drive sleeve and to receive a rotative reaction force from said operating assembly; and means for continuously directing the fluid output of said pumping means to said friction elements for providing cooling thereof during all phases of operation.

2. A self-contained wet clutch system as in claim 1, in which said operating assembly comprises means defining hydraulic servo means in cooperation with said driving means for selectively moving said sleeve assembly along said driven shaft, said servo means being interposed in the fluid communication between said pumping means and said friction elements, and said means for directing the fluid output of said pump is also effective to selectively restrict fluid flow therethrough for increasing fluid pressure to actuate said servo means for promoting clutch disengagement by said operating assembly.

3. A self-contained wet clutch system as in claim 2, which further comprises a manual actuating means for selectively moving said operating assembly along said driven shaft and thereby actuate the fluid directing means for proportionally restricting fluid flow to actuate said servo means for assisting said manual means for promoting clutch disengagement by said operating assembly.

4. A wet clutch system as in claim 1, in which said fluid enclosure defined by the said input and output means is effective to direct fluid from the radially innermost portion of said enclosure to the radially outermost portion while traversing the friction elements carried therein, said enclosure having axially directed passage means at the outermost portion thereof for returning said fluid to pumping means and effective to prevent fluid foaming and heat generation thereof.

5. A self-contained wet clutch system, comprising: rotatable input means having an axis of rotation and comprising an annular drive ring, a generally flat backing plate coupled to one side of said drive ring and extending radially inwardly therefrom, said backing plate having a central opening and annular flange means extending in opposite axial direction of said backing plate, a drive sleeve journalled in said back plate opening and carrying an annular element for providing a rotative connection with said flange means of said backing plate while providing freedom to reciprocate in an axial direction relative thereto; rotatable output means comprising an annular hub having a shaft coupled thereto and extending through said drive sleeve for being journalled therein, said input and output means cooperating to define a fluid enclosure; a plurality of friction elements carried by each of said input and output means and disposed in said fluid enclosure; resilient means reacting against said backing plate for normally urging said friction elements into inter-engagement; means for selectively disengaging said friction elements comprising first and second elements forming a reciprocal assembly fixed against rotation while free to move along said driven shaft relative to each other as well as to said driven shaft, the first of said elements carrying pumping means receiving rotary drive from said drive sleeve, the second of said elements cooperating to define a pressure chamber in conjunction with said backing plate and rearward flange thereof; manual means for moving said elements along said driven shaft; and means normally directing the fluid output of said pumping means through said pressure chamber to said fluid enclosure for bathing said friction elements and selectively effective to proportionally restrict fluid flow from said pressure chamber in response to the degree of axial movement of said elements for increasing fluid pressure in said pressure chamber to provide a hydraulic assist to said manual means.

6. A self-contained wet clutch system as in claim 5, in which said fluid directing means comprises a passage in communication with said fluid enclosure and adapted to be progressively closed by said second element upon manual actuation of said first element relative to the said second element.

7. A self-contained wet clutch system as in claim 5, in which said second element comprises a sup-shaped member having an inner lip thereof slidable upon said flange means of said backing plate and a central tubular portion slidable upon the exterior of said drive sleeve.

8. A self-contained wet clutch system as in claim 5, in which said means for selectively disengaging said elements comprises a plurality of radially directed pivotal levers operatively connected with said resilient means, said levers having a radially inner portion moveable in a direction to pull said resilient means from said friction elements, and said second element carrying a radially directed flange for engaging the inner portion of said levers.

9. A self-contained wet clutch system comprising: clutching means having an enclosure and a rotative input and output with inter-engageable friction elements therebetween disposed in said enclosure, resilient means normally providing engagement of said elements, a sleeve juxtaposed to said clutching means and concentric with the axis thereof, said sleeve being in driving rotative relationship with said input while arranged for limited axial freedom relative thereto, a rotatively stationary pump housing piloted on said sleeve effective to move axially therewith, pumping elements disposed within said pump housing effective to receive rotative drive from said sleeve and rotative reaction from said pump housing for operation, a brake plate carried by said pump housing and effective to be reciprocally moved therewith for braking operation, and a member mechanically inter-connected with said resilient engaging means and with said pump housing effective while being maintained rotationally stationary therewith, said pump housing being effective to be moved manually for overcoming the effect of said resilient means by way of said member for disengaging said clutching means.

10. A wet clutch system as in claim 9, in which said member inter-connecting said resilient means and said pump housing is also adapted for relative sliding movement with respect to said pump housing and is effective to define a pressure chamber in cooperation with said input, said pressure chamber being in fluid communication with said enclosure and said fluid directing means is responsive to reciprocal movement of said pump housing for proportionally diverting a portion of the fluid output of said pump to said pressure chamber for hydraulically actuating said member to move with said pump housing and thereby provide a hydraulic assist to promote disengagement of said clutch means.

References Cited

UNITED STATES PATENTS

| | | | |
|---|---|---|---|
| 3,104,746 | 9/1963 | Gadd et al. | 192—113.2 |
| 3,249,189 | 5/1966 | Schjolin et al. | 192—113.2 X |

MARK NEWMAN, *Primary Examiner*.

ARTHUR T. McKEON, *Examiner*.